US010769963B2

(12) United States Patent
Jewelewicz

(10) Patent No.: US 10,769,963 B2
(45) Date of Patent: Sep. 8, 2020

(54) BALLET TRAINING DEVICE

(71) Applicant: Natalya Jewelewicz, Boca Raton, FL (US)

(72) Inventor: Natalya Jewelewicz, Boca Raton, FL (US)

(73) Assignee: Natalya Jewelewicz, Boca Raton, FL (US)

( * ) Notice: Subject to any disclaimer, the term of this patent is extended or adjusted under 35 U.S.C. 154(b) by 24 days.

(21) Appl. No.: 16/281,763

(22) Filed: Feb. 21, 2019

(65) Prior Publication Data

US 2019/0259299 A1 Aug. 22, 2019

Related U.S. Application Data

(60) Provisional application No. 62/633,724, filed on Feb. 22, 2018.

(51) Int. Cl.
| | |
|---|---|
| G09B 19/00 | (2006.01) |
| A63B 21/04 | (2006.01) |
| A63B 23/10 | (2006.01) |
| A63B 21/00 | (2006.01) |
| A63B 23/08 | (2006.01) |
| A63B 21/055 | (2006.01) |

(52) U.S. Cl.
CPC .......... *G09B 19/0015* (2013.01); *A63B 21/04* (2013.01); *A63B 21/0555* (2013.01); *A63B 21/4025* (2015.10); *A63B 23/08* (2013.01); *A63B 23/10* (2013.01); *G09B 19/0038* (2013.01)

(58) Field of Classification Search
CPC ............ G09B 19/0015; G09B 19/0038; A63B 21/04; A63B 23/10; A63B 21/4025; A63B 23/08; A63B 21/0555
See application file for complete search history.

(56) References Cited

U.S. PATENT DOCUMENTS

| | | | | |
|---|---|---|---|---|
| 1,677,728 A | * | 7/1928 | Robinson ........... | A63B 69/0028 482/51 |
| 2,720,396 A | * | 10/1955 | Pfaus ................. | A63B 23/0417 482/130 |
| 2,835,426 A | * | 5/1958 | Terry ..................... | A63B 27/02 182/221 |
| 2,959,796 A | * | 11/1960 | De Sander ............. | A63B 35/06 441/131 |
| 3,147,498 A | * | 9/1964 | Convis .................... | B63C 11/46 441/65 |

(Continued)

*Primary Examiner* — Garrett K Atkinson
(74) *Attorney, Agent, or Firm* — Snell & Wilmer L.L.P.

(57) ABSTRACT

A ballet training device configured to promote proper foot placement and aid in the development of proper strength and musculature is disclosed herein. The ballet training device may comprise a first loop coupled to a second loop at an overlap point, a resistance band coupled to a lateral portion of the first loop and to a lateral portion of the second loop, the resistance band configured to be disposed on a lateral side of a wearer's foot, and a traction mechanism disposed on at least a portion of the first loop and at least a portion of the second loop. The first loop is configured to encircle the wearer's ankle, the second loop is configured to encircle the wearer's foot, and the overlap point is configured to be disposed above the wearer's instep such that the device is generally in the shape of an infinity sign.

7 Claims, 3 Drawing Sheets

(56) References Cited

U.S. PATENT DOCUMENTS

| | | | | |
|---|---|---|---|---|
| 3,215,429 A | * | 11/1965 | Shaboo | A63B 21/4007 482/125 |
| 3,286,287 A | * | 11/1966 | Martin | A63B 31/08 441/57 |
| 3,290,707 A | * | 12/1966 | Montgomery | A63B 31/08 441/59 |
| 3,295,517 A | * | 1/1967 | Stevens | A61F 5/0104 602/19 |
| 3,342,482 A | * | 9/1967 | Paolone | A63B 21/0608 482/110 |
| 4,088,326 A | * | 5/1978 | Bifulco | A63B 69/0059 473/207 |
| 4,846,464 A | * | 7/1989 | Jorno | A63B 21/065 482/105 |
| 4,955,608 A | * | 9/1990 | Dougherty | A63B 21/0552 273/DIG. 19 |
| 5,465,428 A | * | 11/1995 | Earl | A63B 21/0552 2/227 |
| 5,558,609 A | * | 9/1996 | Olschansky | A63B 21/0552 482/122 |
| 5,695,437 A | * | 12/1997 | Olschansky | A63B 21/0552 482/122 |
| 5,778,452 A | * | 7/1998 | Dicker | A41D 13/0015 2/227 |
| 5,807,218 A | * | 9/1998 | Nagatomo | A61F 5/3715 128/869 |
| 5,839,978 A | * | 11/1998 | Evangelist | A63B 69/0059 473/458 |
| 5,857,947 A | * | 1/1999 | Dicker | A63B 21/00185 2/69.5 |
| 6,176,816 B1 | * | 1/2001 | Dicker | A63B 21/00185 2/69.5 |
| 6,213,922 B1 | * | 4/2001 | Afanasenko | A61F 5/01 482/124 |
| 6,375,582 B1 | * | 4/2002 | Harris | A63B 69/0057 473/207 |
| 6,514,149 B2 | * | 2/2003 | Yoon | A63B 63/00 273/400 |
| 6,684,410 B2 | * | 2/2004 | Robinett | A41D 1/08 2/228 |
| 6,821,235 B1 | * | 11/2004 | Johnson | A63B 21/0552 482/146 |
| 7,730,552 B2 | * | 6/2010 | Ota | A41D 13/0015 2/227 |
| 7,744,511 B2 | * | 6/2010 | Grigoriev | A61F 5/0102 482/121 |
| 7,931,571 B2 | * | 4/2011 | Bernardoni | A61F 5/0102 434/255 |
| 8,986,177 B2 | * | 3/2015 | von Hoffmann | A63B 23/0494 482/124 |
| 9,498,691 B2 | * | 11/2016 | Antoine | A63B 69/0022 |
| 9,592,422 B2 | * | 3/2017 | Robinson | A63B 23/08 |
| 9,630,081 B2 | * | 4/2017 | Gillespie | A63B 21/00043 |
| 2002/0049092 A1 | * | 4/2002 | Yoon | A63B 69/36 473/197 |
| 2015/0190669 A1 | * | 7/2015 | Matsuura | A63B 23/0494 482/8 |
| 2015/0190673 A1 | * | 7/2015 | Robinson | A63B 21/4015 482/8 |
| 2016/0038783 A1 | * | 2/2016 | Matsuura | A63B 21/00845 482/124 |
| 2016/0324233 A1 | * | 11/2016 | Voyvodic | A63B 21/00185 |
| 2017/0189777 A1 | * | 7/2017 | Robinson | G09B 19/0038 |
| 2018/0043200 A1 | * | 2/2018 | Werhrell | A63B 21/0442 |

* cited by examiner

BALLET TRAINING DEVICE

CROSS REFERENCE TO RELATED APPLICATION

This application claims the benefit of priority to U.S. Provisional Patent Application No. 62/633,724, titled BALLET TRAINING DEVICE and filed Feb. 22, 2018, which is hereby incorporated by reference in its entirety.

FIELD

This disclosure generally relates to training and support devices, and more particularly, to a ballet training device that promotes proper foot placement to aid in, for example, the development of proper strength and musculature.

BACKGROUND

Many sports training devices exist and some are designed for improving performance in certain activities and avoiding injuries. The incidence of foot and ankle injuries in dancers is among the highest in any physical activity, and this is often due to improper foot position and insufficient strength and stability. Dancers often lost critical training and performance time due to these injuries and may be forced to end their careers prematurely.

Some of the training devices configured for use in ballet are known as ballet stretch devices. Such ballet stretch devices are configured to increase flexibility in the top of the foot to allow a dancer to pointe the foot with an increased range. Experienced ballet dancers consider such devices problematic in that this kind of forceful stretch training can consequently weaken the ankle if not supplemented by strength exercises. Moreover, such ballet stretch devices cannot be worn while dancing.

Ballet dancers typically do not want to use a support device to fix a bad habit because such a device would make the dancer too reliable on the device for proper technique and placement. Certain ballet dancers may also use ankle braces or foot braces, but such braces do not spread the load appropriately along the medial and lateral parts of the ankle. Furthermore, such braces cannot typically be worn with a pointe shoe or a flat canvas shoe.

When ballet dancers go en pointe, a tremendous load is usually placed on the foot and ankle, and dancers (particularly those who have recently begun training en pointe) typically have a natural tendency to supinate their feet excessively, displacing the load onto the lateral tendons and ligaments in the foot and ankle. This is known as "sickling" and can occur when dancers stand on flat feet, stand en pointe, or hold a foot aloft. Dancers must consciously remember to hold their feet in the proper position, allowing the necessary muscles to strengthen and maintain the proper position with less effort. However, because there exists a natural tendency towards supination of the feet, and because young dancers are so eager to train en pointe without having developed the proper strength and technique, injuries are unfortunately common.

As such, a strong need exists for a device that causes dancers to consciously correct the habit of supination. Moreover, a strong need exists in the ballet market for training devices that focus on strength development, and that can be worn while dancing in class or during performance.

SUMMARY

A ballet training device may comprise a first loop coupled to a second loop at an overlap point, and a resistance band coupled to a lateral portion of the first loop and to a lateral portion of the second loop. In various embodiments, the resistance band is configured to provide a tactile force in response to at least one of supination or sickling by a wearer. In various embodiments, the resistance band is configured to provide a resistance force in response to at least one of pronation or winging by a wearer. In various embodiments, at least one of a lateral portion of the first loop or a lateral portion of the second loop is configured to provide a resistance force in response to at least one of supination or sickling by a wearer. In various embodiments, at least one of a medial portion the first loop or a medial portion of the second loop is configured to provide a resistance force in response to at least one of pronation or winging by a wearer.

In various embodiments, the first loop is configured to encircle a wearer's ankle and the second loop is configured to encircle the wearer's foot. In various embodiments, the ballet training device is generally in the shape of an infinity sign. In various embodiments, the ballet training device further comprises a traction mechanism disposed on at least a portion of the first loop and at least a portion of the second loop. In various embodiments, the second loop is configured to compress a shank of a pointe shoe towards a wearer's arch.

A ballet training device may comprise a strap comprising a first end removably coupled to a second end, wherein the strap comprises an inner surface configured to be placed against a wearer's body, and an outer surface disposed opposite the inner surface, wherein a portion of the inner surface is configured to overlap a portion of the outer surface at an overlap point, the overlap point being configured to be disposed above the wearer's instep, and wherein the strap is generally in the shape of an infinity sign comprising a first loop and a second loop. The ballet training device may further comprise a resistance band coupled to the first loop and to the second loop.

In various embodiments, the resistance band is configured to provide a resistance force in response to at least one of supination or sickling by a wearer. In various embodiments, the resistance band is configured to provide a tactile force in response to at least one of pronation or winging by a wearer. In various embodiments, at least one of a lateral portion of the first loop or a lateral portion of the second loop is configured to provide a resistance force in response to at least one of supination or sickling by a wearer. In various embodiments, at least one of a medial portion the first loop or a medial portion of the second loop is configured to provide a resistance force in response to at least one of pronation or winging by a wearer.

In various embodiments, the first loop is configured to encircle a wearer's ankle and the second loop is configured to encircle the wearer's foot. In various embodiments, the ballet training device further comprises a traction mechanism disposed on at least a portion of the first loop and at least a portion of the second loop. In various embodiments, the second loop is configured to compress a shank of a pointe shoe towards a wearer's arch. In various embodiments, the ballet training device further comprises at least one of stitches, snaps, hook and loop, magnets, adhesive, buttons, toggles, or hook and eye, disposed on at least one of the first end or the second end, and configured to removably couple first end to second end with one full twist of the strap.

A ballet training device configured to promote proper foot placement and aid in the development of proper strength and musculature may comprise a first loop coupled to a second loop at an overlap point, a resistance band coupled to a lateral portion of the first loop and to a lateral portion of the second loop, the resistance band configured to be disposed on a lateral side of a wearer's foot, and a traction mechanism disposed on at least a portion of the first loop and at least a portion of the second loop. In various embodiments, the first loop is configured to encircle the wearer's ankle, the second loop is configured to encircle the wearer's foot, the overlap point is configured to be disposed above the wearer's instep, and the device is generally in the shape of an infinity sign. In various embodiments, the resistance band is configured to provide a resistance force in response to at least one of supination or sickling by the wearer.

BRIEF DESCRIPTION OF THE DRAWINGS

The subject matter of the present disclosure is particularly pointed out and distinctly claimed in the concluding portion of the specification. A more complete understanding of the present disclosure may be obtained by referring to the detailed description and claims when considered in connection with the drawing figures, wherein like numerals denote like elements. Each of the various Figures and components may be in accordance with various embodiments of the disclosure.

DETAILED DESCRIPTION

Figure 1:
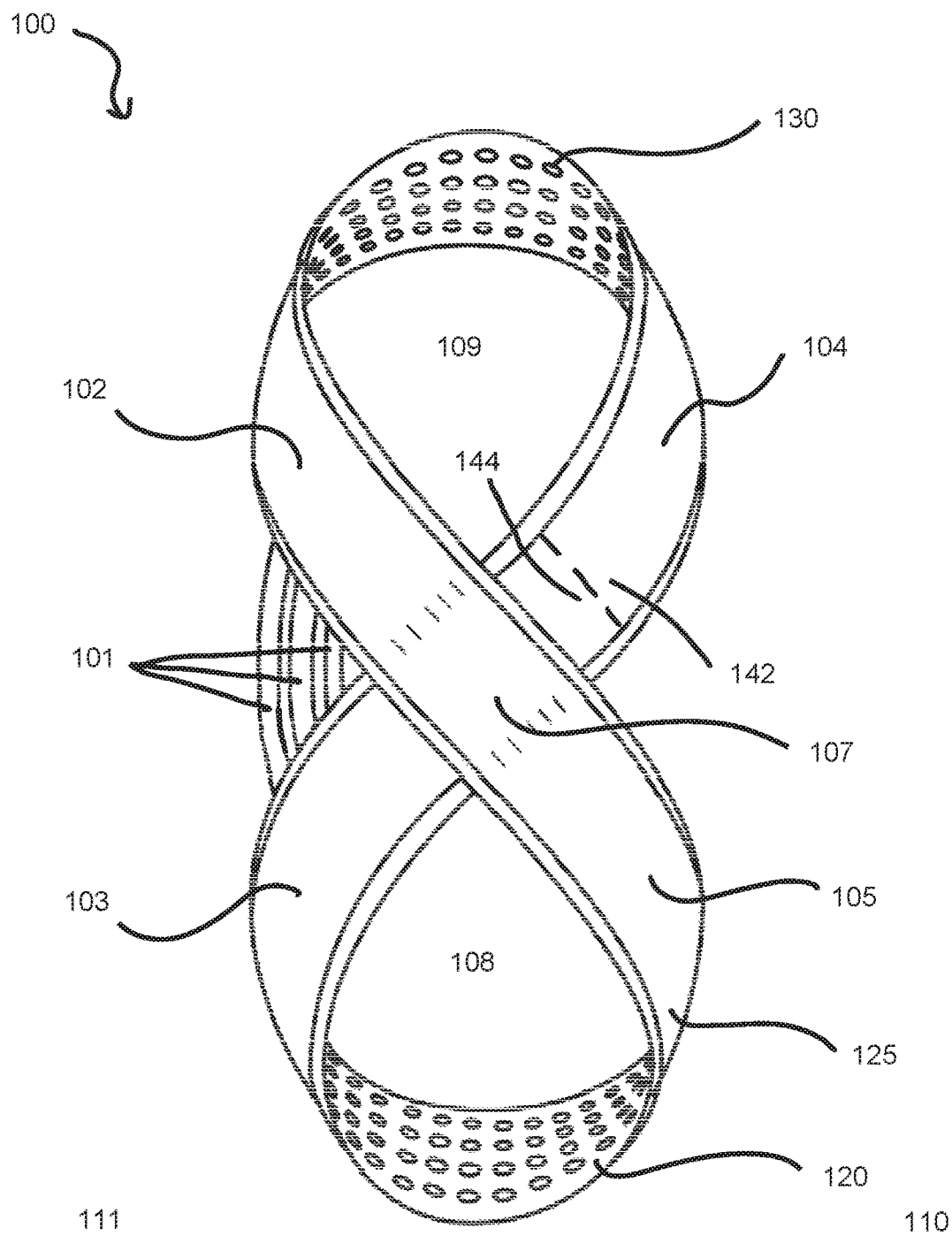
FIG. 1 illustrates a perspective view of a ballet training device, in accordance with various embodiments.

The features and elements discussed herein may be combined in various combinations without exclusivity, unless expressly indicated herein otherwise. These features and elements as well as the operation of the disclosed embodiments will become more apparent in light of the following description and the accompanying figures. The detailed description of various embodiments herein refers to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the manufacturing functions or steps may be outsourced to or performed by one or more third parties. Furthermore, any reference to singular includes plural embodiments, and any reference to more than one component may include a singular embodiment.

This disclosure includes a ballet training device that may be used by ballet dancers. While the ballet training device will be described with respect to ballet dancers, one skilled in the art will appreciate that the device may be used in any sport, activity or work that may include similar challenges, training or support. The ballet training device can be easily worn with ballet shoes, requiring no (or little) modification to the shoe or size. In various embodiments, the ballet training device does not need an adjustable strap, which can often be a burden, provide a less than refined look, hinder certain dance movements and get in the way of certain ballet moves. This ballet training device promotes proper foot placement and aids in the development of proper strength and musculature in, for example, young dancers. The ballet training device reduces the incidence of foot and ankle injuries in dancers by avoiding or minimizing improper foot position and insufficient strength and stability. The ballet training device does not prevent dancers from improperly pronating or supinating their feet or fix the dancers' bad habits because such a device would make the dancers too reliant on the device for proper technique and placement. Rather, the ballet training provides a resistance force and/or tactile cues to dancers, such that they are notified of their improper foot placement and encouraged to correct it.

The resistance force provided by the ballet training device restricts the foot from turning in the wrong position—either with supination or pronation—thus strengthening the ankle muscles. As used herein, supination refers to rotation of the ankle and/or arch of the foot in a lateral direction such that the toes are disposed medial to the inner ankle; when the foot is pointed, supination can be referred to as "sickling" or a "sickled foot." As used herein, pronation refers to rotation of the ankle and/or arch of the foot in a medial direction such that the toes are disposed lateral to the inner ankle; when the foot is pointed, pronation can be referred to as "winging" or a "winged foot."

In various embodiments, the different versions of the ballet training device may include different resistance levels. The ballet training device may include replaceable components, such that, for example, the rubber, elastic or other parts may be replaced to adjust the resistance levels. The ballet training device may include different versions with different lengths and/or widths that may include different resistance levels. The different components or different versions may include different colors or other indicators to represent, for example, different resistance levels or resistance amounts. In various embodiments, the ballet training device may comprise the same color as ballet shoes and/or pointe shoes such that they may be worn during performance.

In various embodiments, the ballet training device causes the dancer to consciously correct his or her bad habit of sickling. When a dancer sickles his or her foot, a resistance force generated by the ballet training device in response to incorrect placement of the foot provides a tactile cue to the dancer, thereby reminding the dancer to move the foot to the correct position. The ballet training device may be configured to hold the foot and ankle in the appropriate position, providing gentle support and acting as a reminder to hold the foot in the proper position. When the foot does supinate excessively, the dancer will feel tension, or a resistance force, along the lateral portions of the ballet training device and will be reminded to correct the injurious foot position. The ballet training device may significantly reduce the rate of injury associated with dance-related foot and ankle injury by providing support and providing a palpable sensation of tension when the foot rolls into an improper position.

More particularly, in various embodiments, the ballet training device includes an elastic strap sewn together in such a fashion that it offers resistance on the outside or lateral side of the ankle, or on the inside or medial side of the ankle, when the foot is placed in an incorrect position. Once sewn, the device may generally be disposed in the shape of an infinity sign or figure "8." The device may be configured as a single band, but a similar band with multiple parts providing similar features is also contemplated. The device may be very flexible, yet durable.

In various embodiments, the strap may be about 36 cm long and 1.5 inches wide. However, the ballet training device may comprise any length and width suitable for use as a ballet training device. In various embodiments, Rayon may cover the elastic. In various embodiments, the strap comprises knit nylon. However, the ballet training device may comprise any material with any suitable stretch and resistance characteristics.

The ballet training device, when disposed in its figure "8" configuration, may comprise a first loop and a second loop. The ballet training device may slip over a wearer's foot, with the first loop encircling the top of the ankle and the second loop encircling the foot and being disposed under the arch of the foot. The ballet training device may include a traction mechanism, for example, silicon dots disposed on an inner surface of the strap. The traction mechanism may be configured to create friction between the inner surface of the strap and the wearer and/or the wearer's shoes, tights, etc., so as to prevent relative movement between the strap and the wearer and/or the wearer's shoes, tights, etc.

The ballet training device may be configured not to restrict movement of the Achilles tendon or the arch, which allows the ballet training device to be worn while performing any dance movements, including at barre and center during a ballet class. The ballet training device may be used to improve the technique and ability for all dancers, and particularly, young dancers. The ballet training device may allow dancers to consciously think about correcting a sickled foot when pointed or when standing in first position, second position, third position, fourth position, and fifth position. The ballet training device may also aids in placing the foot in the proper position, while increasing strength in the ankle muscle as a consequence of the resistance force and/or tactile force provided by the resistance band.

The ballet training device may include straps and/or resistance bands with different resistance. More advanced dancers who simply want to strengthen their ankles or warm up their feet may use a ballet training device with higher resistance. The material of the strap and/or resistance band may be durable and easy to clean. The simplicity of the ballet training device causes it to be inexpensive to fabricate. Existing shoes may not need to be modified in that this ballet training device can be worn outside a pointe shoe or flat shoe. The ballet training device may be utilized when pointe shoes lack elastics, ribbons, or other elements necessary to secure a pointe shoe to a dancer's foot, for example, when pointe shoes are sold and/or fitted. Moreover, the ballet training device may be used as a safety device to secure a pointe shoe to a dancer's foot in the event of mechanical failure by the pointe shoe's elastics and/or ribbons.

When a foot is winged, the resistance force created by the resistance band on the outside of the ankle, for example at a lateral portion of the first loop, may be counterbalanced by tension and/or resistance created from the opposite underside of the foot, for example at a medial portion of the second loop. Similarly, when a foot is sickled, the resistance force created by the resistance band on the outside of the foot, for example at a lateral portion of the second loop, may be counterbalanced by tension and/or resistance created from the opposite side of the ankle, for example at a medial portion of the first loop. Such an arrangement is very different from simply slipping on an Ace bandage because an ace bandage restricts movement of the ankle. An ace bandage also does not have the outer restriction and additional stability from the extra rubber pieces. An Ace bandage does not have an inner layer of silicon dots the prevent slippage while training. Unlike an Ace bandage, this device does not require Velcro or adjustable pieces which makes the device convenient for a dancer to slip on and off the foot.

The ballet training device encourages proper placement of the foot with a dancer's awareness, but it does not restrict movement of the Achilles tendon, which may be essential for the tendon to remain unhindered as a dancer needs to point her foot using this tendon. The device may not restrict any flexion or extension of the foot and/or ankle. The ballet training device may strengthen the particular ankle muscles used for stability en relevé and en pointe, so dancers can eventually wear pointe shoes with reduced chance of injury. The ballet training device may strengthen the ankle muscles by encouraging proper and consistent placement of the foot (this prevents "sickling" of the ankle which weakens the outer muscles of the ankle, essentially over-stretching the muscles which hinders strength and stability). The ballet training device may also provide some resistance against pointing of the foot, thereby strengthening the dancer's instep and/or the top of the ankle requiring more force to push past the resistance of the ballet training device.

With regard to fabrication, the device may be fabricated from a Rayon band, sewn into the disclosed configuration. The parts may be sewn together in the shape of an infinity sign using a durable, wax covered thread. The rubber band may be covered with a layer of Rayon. Different embodiments may be used with different tensile strength to accommodate differing needs and levels of proficiency.

Figure 2:
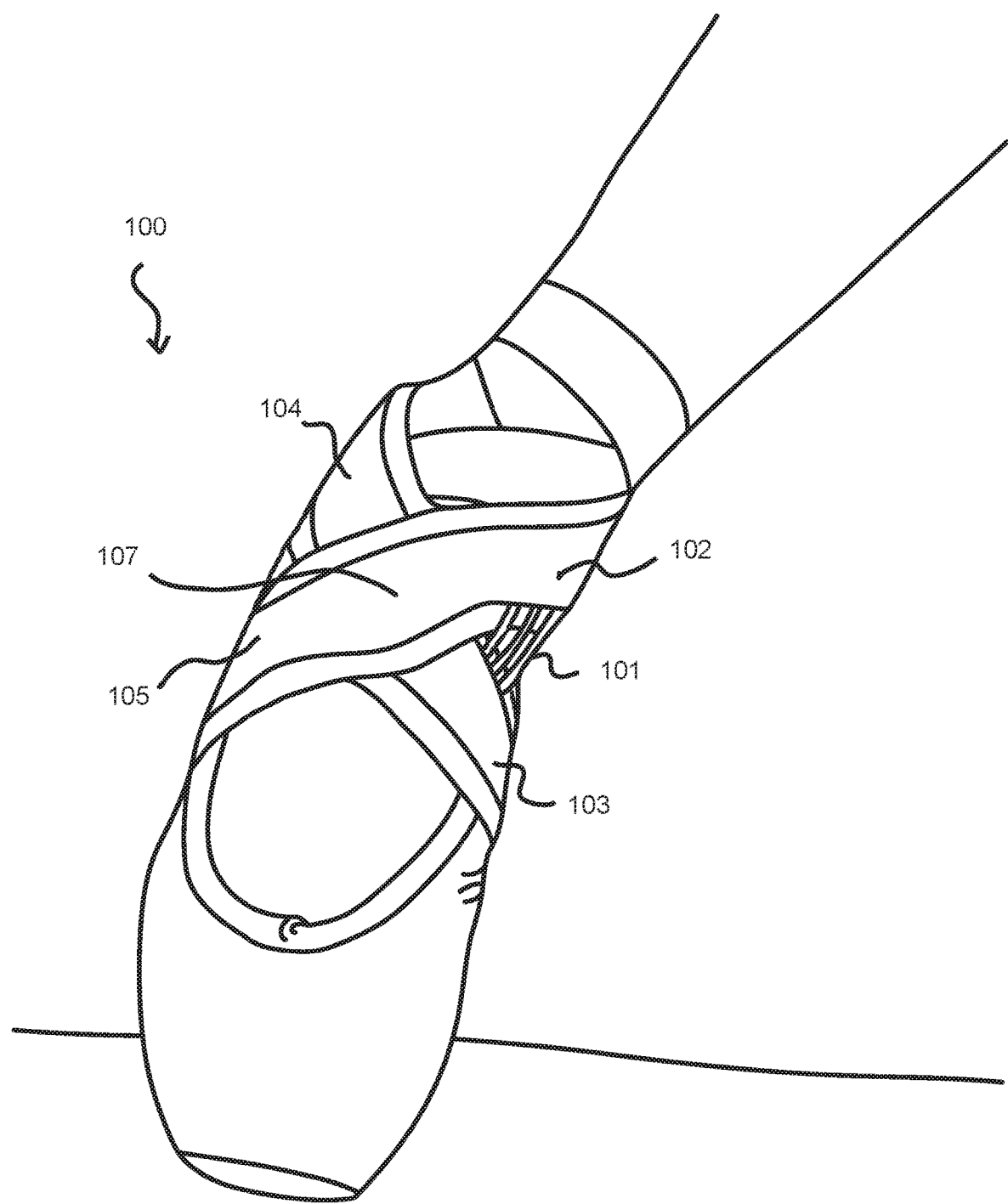
FIGS. 2 and 3 illustrate a ballet training device in use on a wearer's ankle and foot, in accordance with various embodiments.
Figure 3:
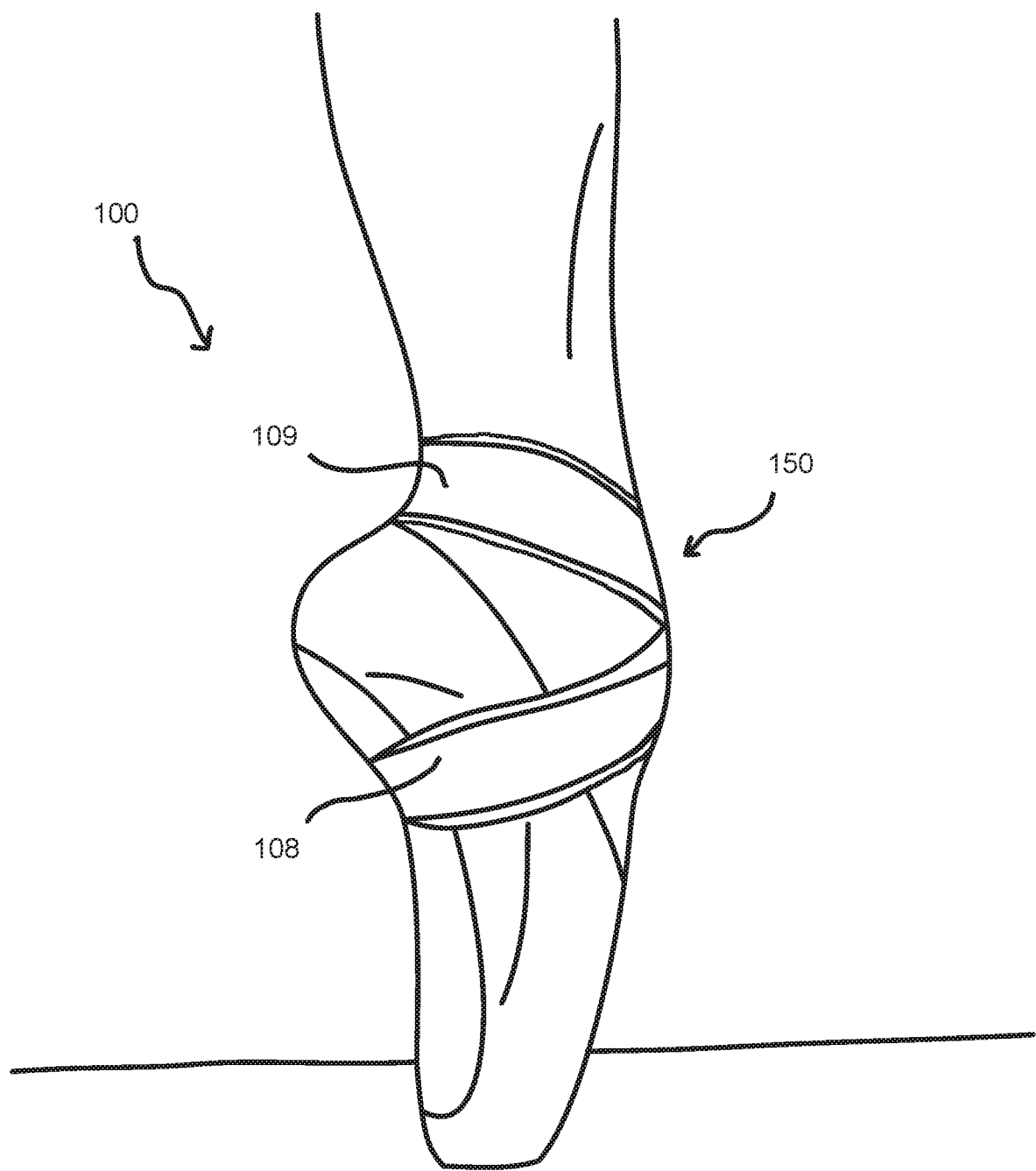

With reference now to FIGS. 1-3, a ballet training device 100 may comprise a linear strap 150 having a first end 142 and a second end 144. The first end 142 and the second end 144 may be removably coupled to one another such that the linear strap is configured in the general shape of an infinity sign and/or a figure "8." Stated differently, the first end 142 may be provided with a full twist (e.g., 360 degrees) before coupling to second end 144. In various embodiments, first end 142 and second end 144 may be removably coupled by any suitable mechanism, for example, one or more buttons, snaps, hook and loop materials, hooks and eyes, toggles, magnets, adhesives, or the like, with complementary portions of such mechanisms disposed respectively on first end 142 and second end 144.

In various embodiments, ballet training device 100, when configured in a figure "8," comprises a first loop 109 and a second loop 108. First loop 109 may be configured to encircle a wearer's ankle and extend from the wearer's instep, around and behind the back of the wearer's ankle, and back to the wearer's instep. Second loop 108 may be configured to encircle a wearer's foot and extend from the wearer's instep, around the bottom and arch of the wearer's foot, and back to the wearer's instep.

In various embodiments, ballet training device 100 further comprises an overlap point 107 configured to be disposed at or above the wearer's instep. First loop 109 and second loop 108 may be coupled to one another at overlap point 107. In various embodiments, first loop 109 and second loop 108 are removably coupled to one another at overlap point 107. In various embodiments, overlap point 107 may be adjustable and/or moveable, such that the relative circumference of first loop 109 and second loop 108 may be changed. In various embodiments, first loop 109 and second loop 108 may be removably coupled at overlap point 107 by any suitable mechanism, for example, one or more buttons, snaps, hook and loop materials, hooks and eyes, toggles, magnets, adhesives, or the like, with complementary portions of such mechanisms disposed respectively on first loop 109 and second loop 108.

In various embodiments, ballet training device 100 further comprises a resistance band 101. Resistance band 101 may comprise elastic, rubber, plastic, or any other suitable material with elastic properties that is configured to elastically resist a stretching force. In various embodiments, resistance band 101 comprises multiple strands of elastic material bound together in a unitary band. In various embodiments, resistance band 101 is coupled to a lateral portion 102 of first loop 109 and to a lateral portion of second loop 108. In various embodiments, resistance band 101 comprises more than one portions extending laterally outward from overlap point 107 and each coupled to a lateral portion 102 of first loop 109 and to a lateral portion of second loop 108. However, in various embodiments, the resistance band comprises a unitary member extending laterally outward from overlap point 107 and coupled to a lateral portion 102 of first loop 109 and to a lateral portion of second loop 108.

As used herein, the lateral side 111 or lateral portions of ballet training device 100 should be understood to refer to those portions configured to be disposed on a lateral side of a wearer's leg, ankle, foot, and the like. As used herein, the medial side 110 or medial portions of ballet training device 100 should be understood to refer to those portions configured to be disposed on a medial side of a wearer's leg, ankle, foot, and the like. However, it will be appreciated by those skilled in the art that ballet training device 100 may be worn on either foot when rotated appropriately. For example, a ballet training device configured to be worn on a wearer's right foot—with the ankle disposed in a first loop and the foot disposed in a second loop—may be rotated 180 degrees and then worn on a wearer's right foot—with the ankle disposed in the second loop and the foot disposed in the first loop.

In various embodiments, strap 150 comprises an inner surface 120 and an outer surface 125. Inner surface 120 may be configured to be disposed next to a wearer's shoe, skin, tights, or the like. Outer surface 125 may be configured to be disposed opposite inner surface 120, facing away from the wearer. In various embodiments, at overlap point 107, inner surface 120 may be removably coupled to outer surface 125 such that, when configured in a figure "8," no portion of outer surface 125 is in physical contact with the wearer's shoe, skin, tights, or the like.

In various embodiments, ballet training device further comprises a traction mechanism 130 disposed on at least a portion of inner surface 120. In various embodiments, traction mechanism 130 comprises silicon dots. However, traction mechanism 130 may comprise adhesive, hook material, textured material, or any other material suitable for creating friction between inner surface 120 and the wearer's shoe, skin, tights, or the like. Traction mechanism 130 may be configured to prevent rotation and/or relative movement of ballet training device 100 relative to a wearer's shoe, skin, tights, or the like, such that resistance band 101 remains properly disposed on a lateral side of the wearer's foot and/or ankle.

In various embodiments, in response to supination and/or sickling of a wearer's foot, ballet training device 100 provide a tactile and/or resistance force to the wearer's foot and/or ankle; for example, one or more of resistance band 101, lateral portion 102 of first loop 109, and medial portion 105 of second loop 108 may resist a sickled foot. In various embodiments, in response to pronation and/or winging of a wearer's foot, ballet training device 100 provide a resistance force to the wearer's foot and/or ankle; for example, one or more of lateral portion 103 of second loop 108, and medial portion 104 of first loop 109 may resist a sickled foot. In various embodiments, in response to pronation and/or winging of a wearer's foot, ballet training device 100 provide a tactile force to the wearer's foot and/or ankle; for example, resistance band 101 may resist compression, thereby pressing into the wearer's foot and/or ankle to signal that the wearer's foot is winged.

In various embodiments, the ballet training device may be configured to intentionally and predictably fail in response to a pronation or supination force that exceeds a predetermined threshold value. For example, the ballet training device may not allow dancers to become reliant on the resistance force it provides in response to pronation and supination. As such, in various embodiments, overlap point 107 is configured to intentionally, predictably, and reversibly decouple inner surface 120 from outer surface 125 in response to a pronation or supination force that exceeds a predetermined threshold value. In various embodiments, resistance band 101 is configured to intentionally, predictably, and reversibly decouple from at least one of lateral portion 102 of first loop 109 and lateral portion of second loop 108.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims.

Any reference to attached, fixed, connected or the like may include permanent, removable, temporary, partial, full and/or any other possible attachment option. Additionally, any reference to without contact (or similar phrases) may also include reduced contact or minimal contact. Different cross-hatching is used throughout the figures to denote different parts but not necessarily to denote the same or different materials. Surface shading lines may be used throughout the figures to denote different parts or areas but not necessarily to denote the same or different materials. In some cases, reference coordinates may be specific to each figure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

What is claimed is:

1. A hands-free ballet training device configured to promote proper foot placement and aid in the development of proper strength and musculature comprising:
    a strap in the form of a continuous loop, wherein the continuous loop is twisted at the middle portion, such that a first portion and a second portion of the continuous loop overlap each other at an overlap point and form a first loop and a second loop,
    wherein an inner surface of the first portion of the loop overlaps onto an outer surface of the second portion of the loop,
    wherein the overlapped portions are adhered together,
    wherein the device is generally in the shape of an infinity sign;
    the first loop is coupled to the second loop at the overlap point;
    a resistance band directly coupled to a lateral portion of the first loop and directly to a lateral portion of the second loop,
    wherein the resistance band is adjacent to the overlap point,
    wherein the resistance band is configured to provide tension to an outside portion of the wearer's ankle,
    wherein the resistance band is configured to provide tension to pull toes of the wearer's foot backward,
    wherein the resistance band is configured to provide a resistance force in response to at least one of supination or sickling by the wearer's foot;
    wherein the resistance band is configured to provide minimal resistance, in response to winging by the wearer's foot to encourage winging from the sickling of the wearer's foot;
    the resistance band configured to be disposed on a lateral side of a wearer's foot; and
    a traction mechanism disposed on at least a portion of the first loop and at least a portion of the second loop,
    wherein the traction mechanism is configured to be placed adjacent to the skin of the wearer, and
    wherein the traction mechanism creates a tactile force that encourages a response to at least one of supination or sickling of the wearer's ankle,
    wherein the first loop is configured to encircle the wearer's ankle,
    wherein the overlap is configured to lay above a top arch section of the wearer's foot,
    wherein the second loop is configured to encircle the wearer's foot and is configured to be placed under an instep the wearer's foot,
    wherein the second loop is configured to provide tension to pull toes of the wearer's foot backward, and
    wherein the overlap point is configured to be disposed above the instep of the wearer's foot.

2. The ballet training device of claim 1, wherein at least one of a lateral portion of the first loop or a lateral portion of the second loop is configured to provide a resistance force in response to at least one of supination or sickling by a wearer.

3. The ballet training device of claim 1, wherein at least one of a medial portion the first loop or a medial portion of the second loop is configured to provide a resistance force in response to at least one of pronation or winging by a wearer.

4. The ballet training device of claim 1, wherein the resistance band includes multiple resistance bands.

5. The ballet training device of claim 1, wherein the resistance band is changeable to provide different resistance forces.

6. The ballet training device of claim 1, further comprising at least one of stitches, snaps, hook and loop, magnets, adhesive, buttons, toggles, or hook and eye, disposed on at least one of the first end or the second end, and configured to removably couple the first end to the second end with one full twist of the strap.

7. The ballet training device of claim 1, wherein the second loop is configured to compress a shank of a pointe shoe towards a wearer's arch.

\* \* \* \* \*